United States Patent
Praxmarer et al.

(10) Patent No.: US 10,144,405 B2
(45) Date of Patent: Dec. 4, 2018

(54) OUTPUT CONTROLLER FOR AN ENGINE CONTROLLER, ENGINE CONTROLLER, AND ENGINE SYSTEM

(71) Applicant: Robert Bosch GmbH, Stuttgart (DE)

(72) Inventors: Meinrad Praxmarer, Vienna (AT); Milos Medvecky, Asperg (DE); Martin Silberbauer, Vienna (AT); Bernd Spielmann, Ingersheim (DE); Andreas Wagner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/319,527

(22) PCT Filed: May 27, 2015

(86) PCT No.: PCT/EP2015/061637
§ 371 (c)(1),
(2) Date: Dec. 16, 2016

(87) PCT Pub. No.: WO2015/193067
PCT Pub. Date: Dec. 23, 2015

(65) Prior Publication Data
US 2017/0320479 A1  Nov. 9, 2017

(30) Foreign Application Priority Data

Jun. 17, 2014  (DE) .................. 10 2014 211 625

(51) Int. Cl.
*B60W 10/06* (2006.01)
*B60W 50/00* (2006.01)
(Continued)

(52) U.S. Cl.
CPC ............ *B60W 10/06* (2013.01); *B60W 10/08* (2013.01); *B60W 20/11* (2016.01);
(Continued)

(58) Field of Classification Search
CPC ...... B60W 10/06; B60W 10/08; B60W 20/11; B60W 2050/0055; B60W 2050/0056
(Continued)

(56) References Cited

U.S. PATENT DOCUMENTS 6,512,967 B2 *  1/2003  Ostberg ................. B60K 6/445
                                              180/65.1
6,831,429 B2 * 12/2004  Fu ............................ B60K 6/48
                                              318/139
(Continued)

FOREIGN PATENT DOCUMENTS

| CN | 1803505 A | 7/2006 |
| CN | 102765382 A | 11/2012 |
| DE | 102010029706 | 12/2011 |

OTHER PUBLICATIONS

International Search Report for Application No. PCT/EP2015/061637 dated Sep. 22, 2015 (English Translation, 2 pages).

*Primary Examiner* — Emma K Frick
*Assistant Examiner* — Brian L Cassidy
(74) *Attorney, Agent, or Firm* — Michael Best & Friedrich LLP

(57) ABSTRACT

An output controller for an engine control for an engine system having an internal combustion engine and an electric generator coupled to the internal combustion engine. The output controller including a computing device, an inertia compensator, and an efficiency calculator. The computing device is configured to calculate a target rotational speed for the electric generator and an output torque for the internal combustion engine The inertia compensating device is configured to calculate a torque transmitted to a shaft of the generator and a desired torque for the internal combustion engine. The efficiency calculator is configured to calculate a
(Continued)

degree of efficiency of the engine system and to adapt the value for a mechanical target output for the engine system.

15 Claims, 12 Drawing Sheets

(51) Int. Cl.
    *B60W 10/08* (2006.01)
    *B60W 20/11* (2016.01)
    *B60K 6/46* (2007.10)
(52) U.S. Cl.
    CPC ........... *B60W 50/0098* (2013.01); *B60K 6/46* (2013.01); *B60W 2050/0041* (2013.01); *B60W 2050/0055* (2013.01); *B60W 2050/0056* (2013.01); *Y02T 10/56* (2013.01); *Y02T 10/6217* (2013.01); *Y02T 10/6286* (2013.01); *Y02T 10/84* (2013.01)
(58) Field of Classification Search
    USPC ...................................................... 180/65.28
    See application file for complete search history.

(56) References Cited

U.S. PATENT DOCUMENTS

| | | | |
|---|---|---|---|
| 7,146,266 B2* | 12/2006 | Teslak | B60K 6/12 701/69 |
| 7,236,873 B2* | 6/2007 | Kuang | B60K 6/445 180/65.28 |
| 7,273,439 B2* | 9/2007 | Kuang | B60K 6/445 477/111 |
| 7,436,081 B2* | 10/2008 | Lane | B60L 11/02 290/400 |
| 8,056,660 B2* | 11/2011 | Imura | B60K 6/44 180/65.24 |
| 8,296,032 B2* | 10/2012 | Wang | B60W 30/188 701/51 |
| 9,545,839 B2* | 1/2017 | Okubo | B60K 6/365 |
| 2004/0088103 A1* | 5/2004 | Itow | B60K 6/485 701/110 |
| 2004/0174124 A1 | 9/2004 | Lee | |
| 2006/0022469 A1 | 2/2006 | Syed et al. | |
| 2008/0179891 A1 | 7/2008 | Lane | |
| 2008/0309093 A1 | 12/2008 | Ando et al. | |
| 2010/0121512 A1* | 5/2010 | Takahashi | B60K 6/365 701/22 |
| 2011/0015811 A1* | 1/2011 | Okubo | B60K 6/365 701/22 |
| 2011/0313602 A1* | 12/2011 | Hirata | B60K 6/365 701/22 |
| 2012/0175890 A1 | 7/2012 | Ge et al. | |
| 2012/0253576 A1* | 10/2012 | Tamagawa | B60K 6/442 701/22 |
| 2013/0045835 A1* | 2/2013 | Schang | B60W 10/06 477/78 |
| 2013/0300126 A1 | 11/2013 | Butzmann | |
| 2013/0307449 A1* | 11/2013 | Kobayashi | B60K 6/48 318/400.02 |
| 2014/0107877 A1* | 4/2014 | Bang | B60L 11/14 701/22 |
| 2015/0307084 A1* | 10/2015 | Bureau | B60K 6/442 701/22 |
| 2015/0336558 A1* | 11/2015 | Yamazaki | B60K 6/442 701/22 |
| 2016/0304084 A1* | 10/2016 | Kawai | B60W 10/06 |

* cited by examiner

OUTPUT CONTROLLER FOR AN ENGINE CONTROLLER, ENGINE CONTROLLER, AND ENGINE SYSTEM

BACKGROUND OF THE INVENTION

The present invention relates to a power controller for an engine controller for an engine system having an internal combustion engine and an electric generator coupled to the internal combustion engine. The present invention also relates to a corresponding engine controller and to a corresponding engine system.

In automotive engineering, an attempt is made to reduce the fuel consumption of modern motor vehicles further and further. In addition to improvements to conventional internal combustion engines, electric motors are also being used more and more often in vehicles. In this case, the electric motors can support the internal combustion engine, for example. This principle is used in so-called hybrid vehicles.

Alternatively, however, the electric motor can also replace the internal combustion engine in the vehicle. A vehicle in which the electric motor is the only drive motor is also called an electric vehicle. On account of the limited capacity of currently available electric energy stores, the range of such electric vehicles is limited.

A so-called range extender provides one possible way of increasing the range of electric vehicles. In electric vehicles with a range extender, in addition to the purely electric drive system, an independent internal combustion engine is coupled to an electric machine in order to produce electric energy for the drive. Depending on the driving state and state of charge of the battery, the electric machine is intended to produce a desired electric power.

A possible range extender is shown in US 2013 300 126 A1, for example.

The power produced by the range extender is usually set by selecting the torque and speed of the internal combustion engine. In order to set the torque in a gasoline engine, the throttle valve and the ignition angle adjustment device are used as the actuator. The adjustable injection duration and the injection angle are used to set the torque in a diesel engine.

However, the best efficiency for the instantaneous speed is established only with a particular torque in internal combustion engines. Since the speed has to be regulated by changing the burner torque, power regulation at optimum efficiency is not possible with this structure.

In order to be able to carry out power regulation at optimum efficiency, the burner torque must not be the output of the speed regulator, but rather must be freely selectable. The speed must be regulated using the torque of the electric machine. This structure is illustrated in FIG. 12.

FIG. 12 shows the structure of a control or regulating system for an engine system, having a superordinate control device 100 which requires a desired electric power 102 from the internal combustion engine control device 103, inter alia from the state of charge 101 of the vehicle battery, also called SOC. In this case, the engine speed can be limited to a maximum value 104 on the basis of specifications with regard to the generation of sound.

In the range extender system—illustrated by way of example here in the internal combustion engine control device 103—a power regulating function 105 regulates the electric output power to the predefined desired power 102. The power regulating function 105 calculates the torque 106 to be output by the internal combustion engine 120 and the speed 107 which is to be set at the generator 121 and is required by an electric machine control device 108. The internal combustion engine control device 103 also contains a function 109 which substantially sets the torque 106 in the internal combustion engine 120 by regulating or controlling the suitable actuators, such as the throttle valve position, the ignition angle and injection quantities and times, depending on the type of internal combustion engine 120.

In the electric machine control device 108, a speed regulating function 110 ensures that the desired speed 107 is adjusted. This can be carried out, for example, using a PI regulator, the input of which may be the measured actual speed and the output of which may be the torque at the electric machine 121. The instantaneous electric machine current 111 and the high voltage 112 are transmitted to the power regulating function 105 which is illustrated here by way of example in the internal combustion engine control device 103. The battery management system 113 continuously determines the SOC 101 and the charging limits of the high-voltage battery 114.

SUMMARY OF THE INVENTION

The following is provided:

A power controller for an engine control system for an engine system having an internal combustion engine and an electric generator coupled to the internal combustion engine, having a computing device which is designed to receive a desired mechanical power for the engine system and a maximum permissible speed for the internal combustion engine and to calculate a desired speed for the electric generator and an output torque of the internal combustion engine on the basis of the desired power and the maximum permissible speed, having an inertia compensation device which is designed to calculate a torque transmitted to a shaft of the generator by a total mass moment of inertia of the internal combustion engine and of the generator on the basis of a change in the desired speed for the electric generator and to calculate a desired torque for the internal combustion engine on the basis of the transmitted torque and the calculated output torque of the internal combustion engine, and having an efficiency calculation device which is designed to calculate an efficiency of the engine system on the basis of the desired speed for the electric generator and the calculated output torque of the internal combustion engine and a battery voltage and a generator current of a battery of the engine system and the calculated desired torque for the internal combustion engine and to adapt the value for the desired mechanical power, which is supplied to the first computing device, on the basis of the calculated efficiency.

The following is also provided:

An engine controller for an engine system having an internal combustion engine and an electric generator coupled to the internal combustion engine, having a power controller according to the invention, having a speed controller which is coupled to the power controller and is designed to obtain an output torque of the internal combustion engine from the power controller and to control the speed of the electric generator on the basis of a desired speed requested from the power controller and the output torque of the internal combustion engine.

Finally, the following is provided:

An engine system having an internal combustion engine, having an electric generator coupled to the internal combustion engine, and having an engine controller according to the invention which is coupled to the internal combustion engine and to the generator and is designed to control the internal combustion engine and the generator.

Advantages of the Invention

The knowledge on which the present invention is based is that regulation at optimum efficiency is not possible using conventional control and regulating systems for electric vehicles with a range extender and an increased fuel consumption is produced thereby.

The idea on which the present invention is based now involves taking this knowledge into account and providing a possibility in which a closed control loop is used with respect to the power of the engine system, thus making it possible to carry out improved power regulation with reduced consumption.

For this purpose, the present invention provides for the required desired mechanical power to be adapted on the basis of an efficiency of the overall system. Furthermore, the present invention also provides for a mass moment of inertia of the internal combustion engine to be used when setting the torque required by the internal combustion engine.

The engine control system according to the invention finally provides for the generator to be controlled on the basis of the desired speed for the generator and on the basis of the output torque of the internal combustion engine.

As a result of the described structure, the present invention makes it possible to control the engine system with a minimum possible fuel consumption. In this case, a desired electric power can be produced at the same time. Furthermore, the power controller can quickly follow a desired change in the desired power. This is important, for example, because power which is produced by recuperation during braking must be immediately compensated for by means of a corresponding power reduction if limitation to a maximum charging power of the battery system becomes effective at the same time.

Advantageous embodiments and developments emerge from the subclaims and from the description with reference to the figures.

In one embodiment, the computing device has a first characteristic curve memory having a characteristic curve which has the optimum speed for the internal combustion engine for a predefined mechanical power, the computing device being designed to select the optimum speed on the basis of the desired mechanical power, the computing device having a speed limiter which is designed to limit the selected optimum speed on the basis of the maximum permissible speed, the computing device having a rate limiter which is designed to obtain the limited speed and to limit the change rate of the limited speed on the basis of a predefined maximum change rate, and the computing device having a first low-pass filter which is designed to subject the speed whose change rate has been limited to low-pass filtering and to output it as the desired speed for the electric generator. In connection with the first characteristic curve memory, the optimum speed for the internal combustion engine should be understood as meaning that speed for a mechanical power at which the internal combustion engine has the lowest fuel consumption. Limiting the maximum change rate allows the flywheel masses in the internal combustion engine and in the generator to be taken into account, and the low-pass filter prevents a jolt in the drive between the internal combustion engine and the generator since an abrupt speed change is prevented.

In one embodiment, the computing device has at least one second characteristic curve memory and a selection device which is designed to select which characteristic curve memory is used to select the optimum speed. If further characteristic curve memories are provided, the further characteristic curve memories can store characteristic curves which have other optimization aims, for example. One of the further characteristic curves may be optimized, for example, to heat the catalytic converter of the internal combustion engine as quickly as possible or to provide an improved dynamic response of the engine system. Further optimization aims may likewise be defined depending on the application.

In one embodiment, the computing device has a division block which is designed to divide the desired mechanical power by a first constant value, in particular by $2*\pi/60$, and by the desired speed for the electric generator and to output the division result as the output torque of the internal combustion engine. This makes it possible to easily convert the required desired mechanical power into an output torque of the internal combustion engine.

In one embodiment, the inertia compensation device has a memory for storing a value of the desired speed and is designed to respectively calculate a change in the desired speed from an instantaneous value of the desired speed and a stored older value of the desired speed, the inertia compensation device having a multiplication device which is designed to multiply the calculated value of the change in the desired speed by a second constant value, in particular by $2*\pi/60$, and by a value of the mass moment of inertia of the internal combustion engine and of the generator. This makes it possible to easily calculate the torque transmitted to the shaft of the generator by the internal combustion engine. If this torque is known, this can be taken into account when controlling the generator and overshooting or understeering can be avoided.

In one embodiment, the efficiency calculation device has at least one third characteristic curve memory which stores characteristic curves for the efficiency of the generator and the efficiency of an inverter of the engine system, which is coupled to the generator, against the speed and the torque, the efficiency calculation device being designed to calculate a theoretical efficiency of the engine system on the basis of efficiencies read from the at least one third characteristic curve memory for the desired speed for the electric generator and for the output torque of the internal combustion engine. In another embodiment, the internal combustion engine and the generator are not coupled to one another via a shaft, but rather via a transmission. In this embodiment, a further third characteristic curve memory is provided and stores a characteristic curve having the efficiency of the transmission against the speed and torque. This makes it possible to exactly calculate the efficiency of the engine system.

In one embodiment, the efficiency calculation device is designed to calculate an output power of the engine system by multiplying the battery voltage by the generator current. The efficiency calculation device is also designed to calculate an input power of the engine system from the desired speed for the electric generator and the output torque of the internal combustion engine.

In one embodiment, the efficiency calculation device is designed to subtract the torque transmitted to a shaft of the generator by the mass moment of inertia of the internal combustion engine from the calculated input power.

In one embodiment, the efficiency calculation device has a second low-pass filter which is designed to subject the calculated output power to low-pass filtering. The efficiency calculation device also has a third low-pass filter which is designed to subject the calculated input power of the engine system to low-pass filtering, the efficiency calculation device being designed to calculate a value, which is based on measured values, for the efficiency by dividing the filtered calculated output power and the filtered calculated input power of the engine system. Calculating and using the value, which is based on measured values, for the efficiency has the advantage that the torque error which occurs in the torque chain in the internal combustion engine control system between the signal tq_ICE and the output to the controllers for the injection, throttle valve and ignition angle does not have any effect and the actual efficiency is therefore calculated.

In one embodiment, the efficiency calculation device has a first high-pass filter and is designed to calculate the total efficiency of the engine system from the value, which is based on desired values, for the efficiency and from a calculation-based value for the efficiency of the engine system, which is based on high-pass filtering of the theoretical efficiency of the engine system using the high-pass filter. If the value, which is based on desired values, for the efficiency is passed through a high-pass filter and the value, which is based on measured values, for the efficiency is passed through a low-pass filter with the same cut-off frequency and if both filtered signals are added to one another, the accuracy of the calculated efficiency can be increased.

In one embodiment, the speed controller has a speed regulator which is designed to calculate a prespecified torque on the basis of the desired speed for the electric generator and an instantaneous speed of the electric generator, the speed control system having a desired current regulator which is designed to calculate a desired current for the generator on the basis of the sum of the prespecified torque and the output torque of the internal combustion engine, and the speed control system also having a current controller which is designed to set the current in the generator on the basis of the calculated desired current. If the output torque of the internal combustion engine is included in the calculation of the desired current, overshooting of the speed or the torque can be avoided.

The above configurations and developments can be combined with one another in any desired manner if useful. Further possible configurations, developments and implementations of the invention also comprise not explicitly mentioned combinations of features of the invention described above or below with respect to the exemplary embodiments. In particular, a person skilled in the art will also add individual aspects to the respective basic form of the present invention as improvements or additions.

BRIEF DESCRIPTION OF THE DRAWINGS

The present invention is explained in more detail below using the exemplary embodiments which are indicated in the schematic figures of the drawings, in which.

DETAILED DESCRIPTION

In all of the figures, identical or functionally identical elements and apparatuses have been provided with the same reference symbols unless indicated otherwise.

Figure 1:
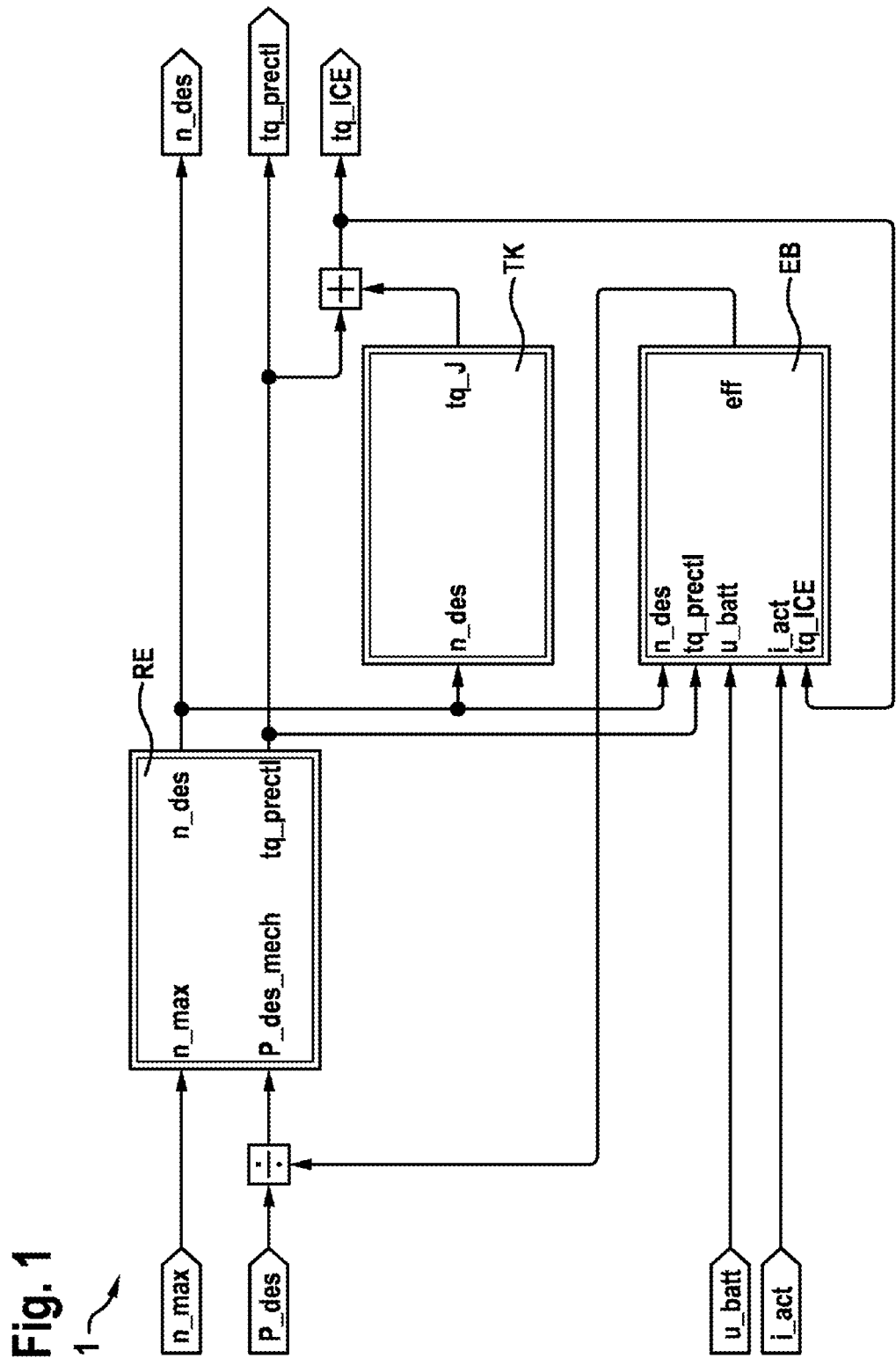
FIG. 1 shows a block diagram of one embodiment of a power controller according to the invention.

FIG. 1 shows a block diagram of one embodiment of a power controller 1 according to the invention.

The power controller 1 has a computing device RE which receives the maximum speed n_max and the desired mechanical power P_des_mech as input variables. The desired mechanical power P_des_mech is calculated from the desired power P_des which is divided by the efficiency eff of the engine system 3 for this purpose.

The computing device RE calculates a desired speed n_des for the generator G and a torque tq_prectl, which is provided by the internal combustion engine M, from the maximum speed n_max and the desired mechanical power P_des_mech.

The desired speed n_des is made available to the inertia compensation device TK which calculates a torque tq_J on the basis of the desired speed n_des. The torque tq_J is positive during acceleration of the internal combustion engine M and is negative during braking of the internal combustion engine M and describes the torque difference between the internal burner torque and the torque output to the crankshaft of the internal combustion engine M.

The torque tq_J is added to the torque tq_prectl, which is provided by the internal combustion engine M, and the sum reveals the desired torque tq_ICE for the internal combustion engine M.

That is to say, the internal torque of the internal combustion engine M is reduced during braking by throttling and ignition angle adjustment and the torque of the internal combustion engine M is increased during acceleration by opening the throttle valve if the latter is not already completely open.

The efficiency calculation device EB calculates the efficiency eff, inter alia, from the instantaneous electric output power Pout and the mechanical input power Pin.

In order to calculate the efficiency eff needed to calculate the desired mechanical power P_des_mech, the efficiency calculation device EB is provided with the desired speed n_des for the generator G and the torque tq_prectl which is provided by the internal combustion engine M. Furthermore, the efficiency calculation device EB is provided with a battery voltage u_batt, a generator current i_act and the desired torque tq_ICE for the internal combustion engine M.

Figure 2:
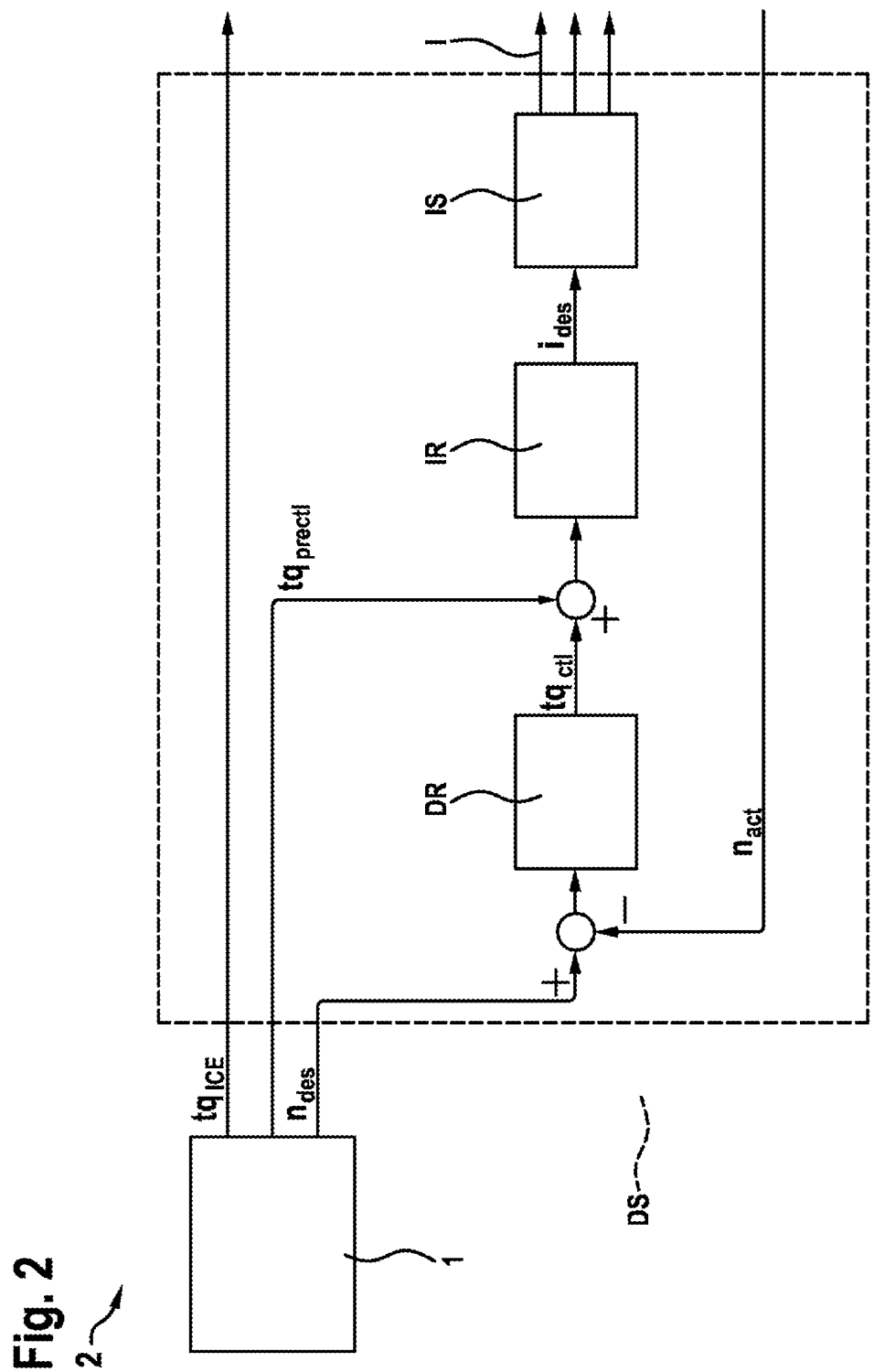
FIG. 2 shows a block diagram of one embodiment of an engine controller according to the invention.

FIG. 2 shows a block diagram of one embodiment of an engine controller 2 according to the invention.

The engine controller 2 has a power controller 1 according to the present invention which is coupled to a speed controller DS and provides the latter with the desired torque tq_ICE for the internal combustion engine M, the desired speed n_des for the generator G and the torque tq_prectl which is provided by the internal combustion engine M.

The speed controller DS has a speed regulator DR which may be in the form of a PI regulator, for example, in one embodiment and calculates a prespecified torque $tq_{ctl}$ for the generator G on the basis of a measured instantaneous speed $n_{act}$ and the desired speed n_des. A desired current regulator calculates a desired current $I_{des}$ for the generator G from the sum of this prespecified torque $tq_{ctl}$ and the torque tq_prectl provided by the internal combustion engine M. Finally, a current controller IS sets the corresponding current I in the individual phases of the generator.

Figure 3:
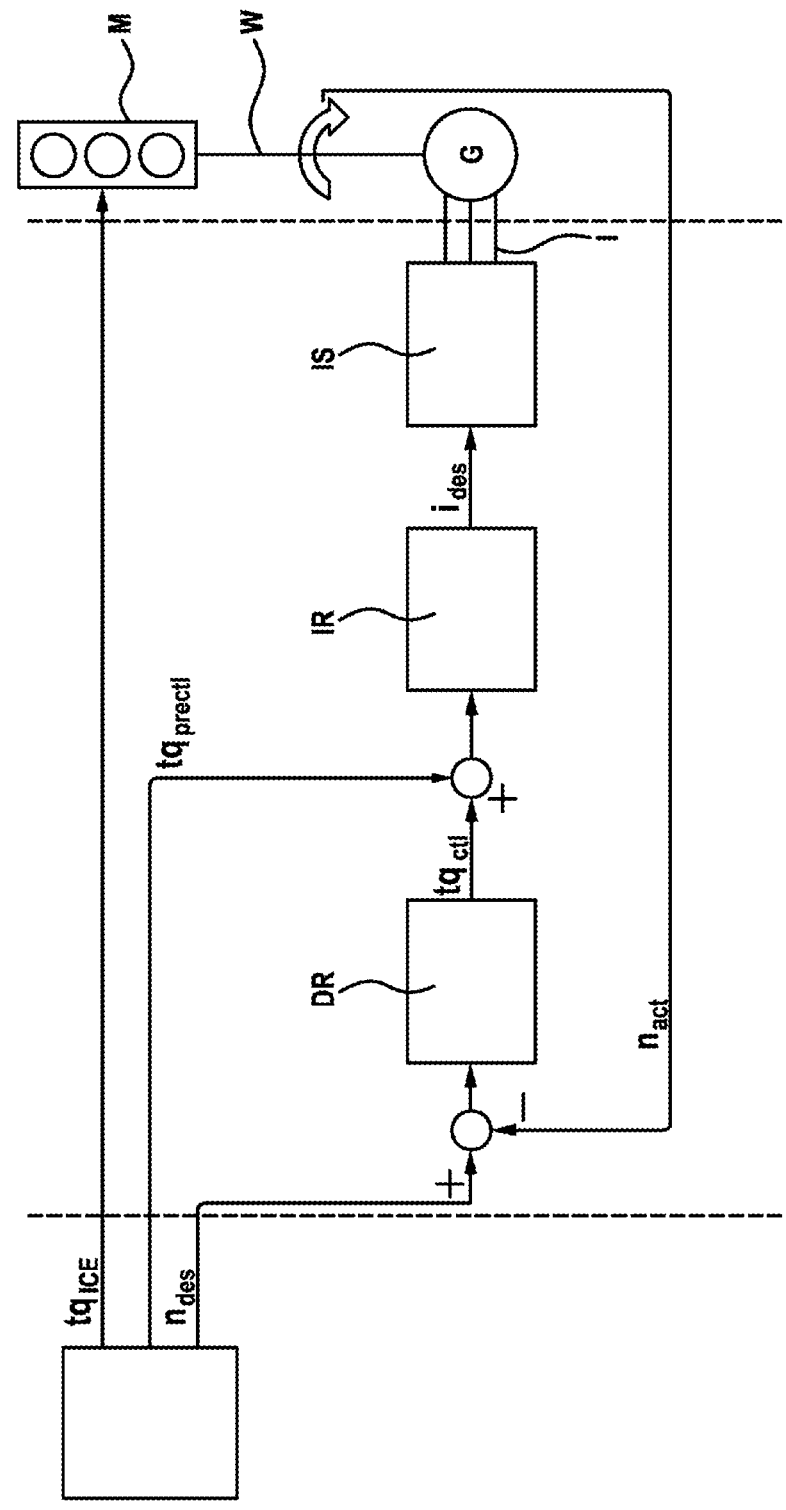
FIG. 3 shows a block diagram of one embodiment of an engine system according to the invention.

FIG. 3 shows a block diagram of one embodiment of an engine system 3 according to the invention. The engine system 3 has the engine controller 2 from FIG. 2. The engine system 3 also has an internal combustion engine M which is provided with the desired torque tq_ICE. The engine system 3 finally also has a generator G which is mechanically coupled to the internal combustion engine M via a shaft W and is controlled by the current controller IS of the engine controller 2. The internal combustion engine M is illustrated only symbolically and may have an engine control device, for example, in one embodiment.

Figure 4:
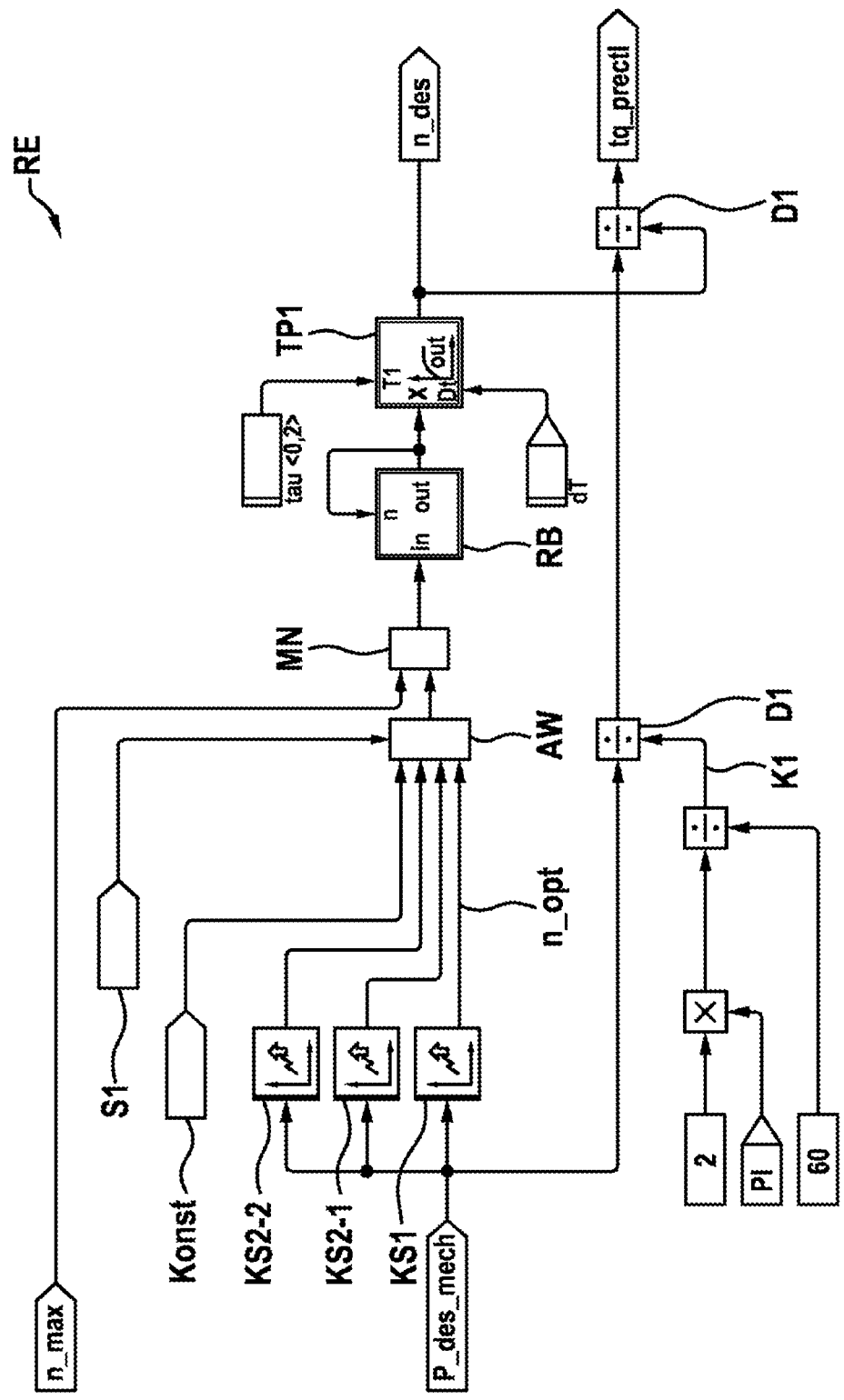
FIG. 4 shows a schematic illustration of one embodiment of a computing device according to the invention.

FIG. 4 shows a schematic illustration of one embodiment of a computing device RE according to the invention.

The computing device RE in FIG. 4 has a first characteristic curve memory KS1 and two second characteristic curve memories KS2-1, KS2-2 which are coupled to an input for the desired mechanical power P_des_mech in order to respectively determine the optimum speed n_opt for the internal combustion engine M from the characteristic curve memories KS1, KS2-1 and KS2-2 for a respective desired mechanical power P_des_mech. The outputs of the characteristic curve memories KS1, KS2-1 and KS2-2 and a constant speed value konst are each coupled to a selection device AW which, on the basis of a first selection signal S1, forwards one of the incoming speed values to a speed limiter MN which limits the speed to the maximum permissible speed. The limited speed is passed to a rate limiter RB which limits the change rate of the speed. This is necessary because an arbitrarily fast speed change is not possible, on the one hand, as a result of the flywheel masses of the internal combustion engine M and of the generator G and any speed change changes the actual power in the opposite direction to the desired power through the flywheel mass, on the other hand. Therefore, the change rate must become lower with the level of the instantaneous speed.

The speed whose change rate has been limited is forwarded to a first low-pass filter TP1 which outputs the desired speed n_des. This is used to avoid a jolt in the drive between the internal combustion engine M and the generator G.

The selection device AW can be used to switch over the choice of the optimum speed n_opt. The second characteristic curve memories KS2-1, KS2-2 may each store characteristic curves which have been optimized for different aims. The characteristic curve stored in the first characteristic curve memory KS1 is used to regulate the power at optimum efficiency, that is to say with the lowest possible fuel consumption.

The characteristic curve stored in the second characteristic curve memory KS2-1 can be used to heat the catalytic converter, for example. In order to make it possible to quickly heat a catalytic converter of the internal combustion engine M and therefore to enable a low-emission post-start phase, the characteristic curve may provide for operation of the internal combustion engine M at higher speeds, for example.

The characteristic curve stored in the second characteristic curve memories KS2-2 can provide the drive system with a higher dynamic response, for example. In order to enable a higher dynamic response of the drive system, the characteristic curve in the characteristic curve memory KS2-2 does not set the optimum efficiency. As a result of the steeper gradient of this characteristic curve and, in particular, as a result of the existing significant torque reserve, it is also possible to change the power in addition to changing the speed as a result of the much quicker torque change. This is necessary in the case of serial hybrids which cannot provide the maximum drive power from the high-voltage battery and must provide a fast power increase from the internal combustion engine. One reason for this is that the power output by the battery is lower than the possible requirement of the drive, and that the maximum current of the high-voltage battery is lower than the current drawn by the drive. This may be the intentional design or may be temporarily the case if, for example, the SOC, and therefore the voltage of the high-voltage battery, is low. Finally, a constant speed can be predefined with the aid of a desired speed specification using the constant value konst.

Furthermore, the output torque tq_prectl is calculated in the computing device RE in FIG. 4 by dividing the desired mechanical power P_des_mech by the instantaneous desired speed n_des and by 2*PI/60 in the division block D1, with the result that the desired mechanical power P_des_mech is set at any time.

Figure 5:
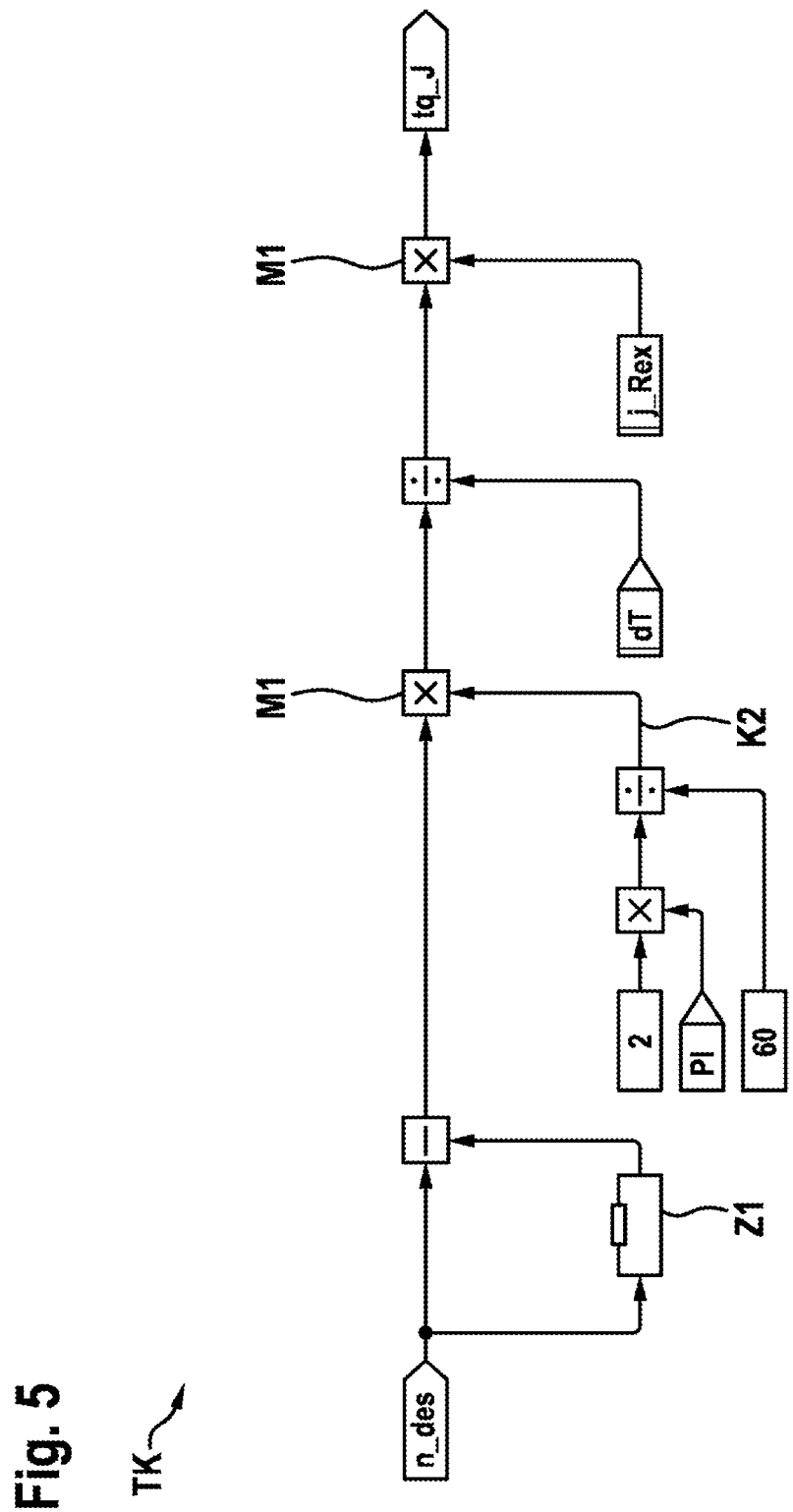
FIG. 5 shows a schematic illustration of one embodiment of an inertia compensation device according to the invention.

FIG. 5 shows a schematic illustration of one embodiment of an inertia compensation device TK according to the invention.

In order to calculate the torque tq_J which is transmitted to the generator G on the basis of the mass inertia of the internal combustion engine M and of the generator G, the change in the angular velocity of the internal combustion engine M is multiplied by the mass moment of inertia j_Rex of the internal combustion engine M and of the generator G in the event of a speed change. In order to calculate the change in the angular velocity, the speed is differentiated and the result is multiplied by 2*PI/60 in the multiplication block M1. Differentiation is carried out, for example, by subtracting a stored speed value from an instantaneous speed value.

Figure 9:
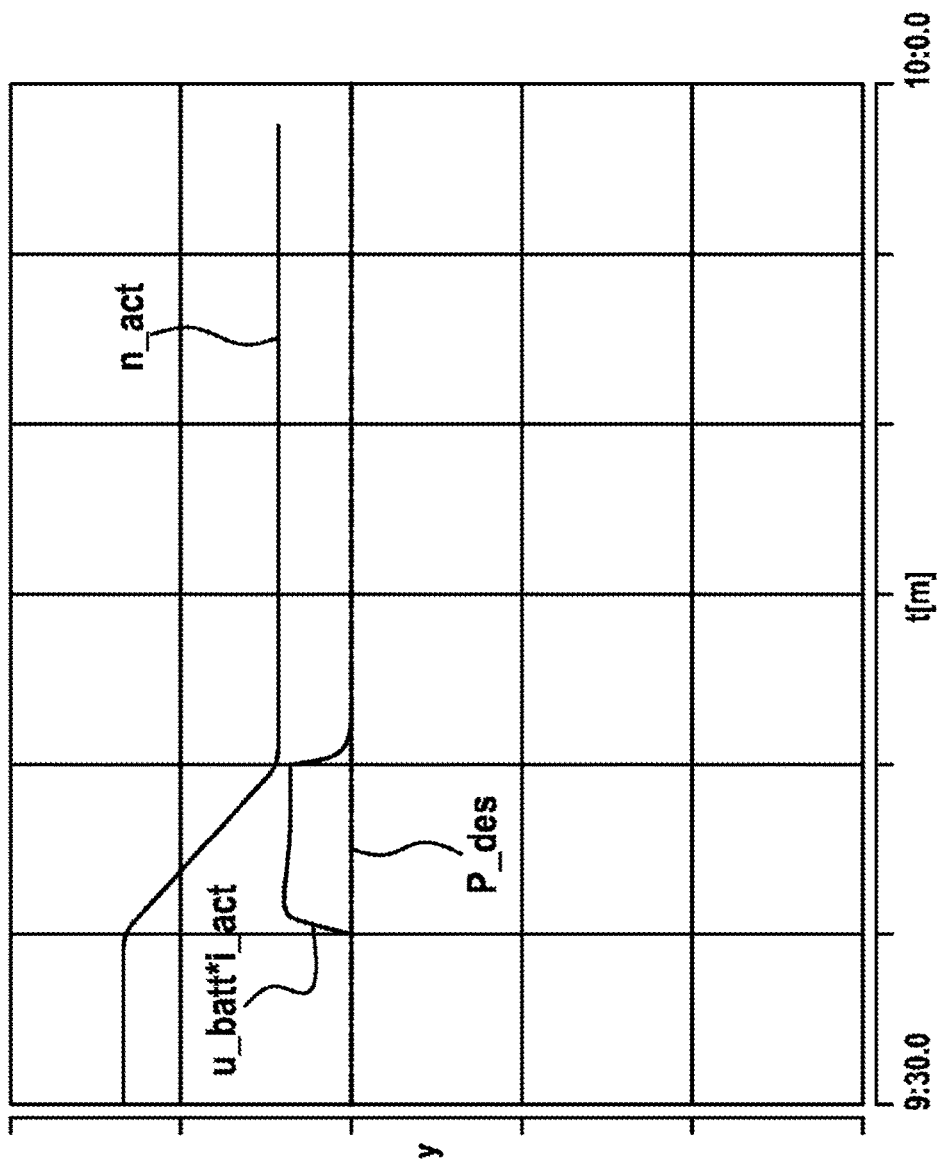
FIG. 9 shows a graph of a speed change in an engine system according to the invention.
Figure 10:
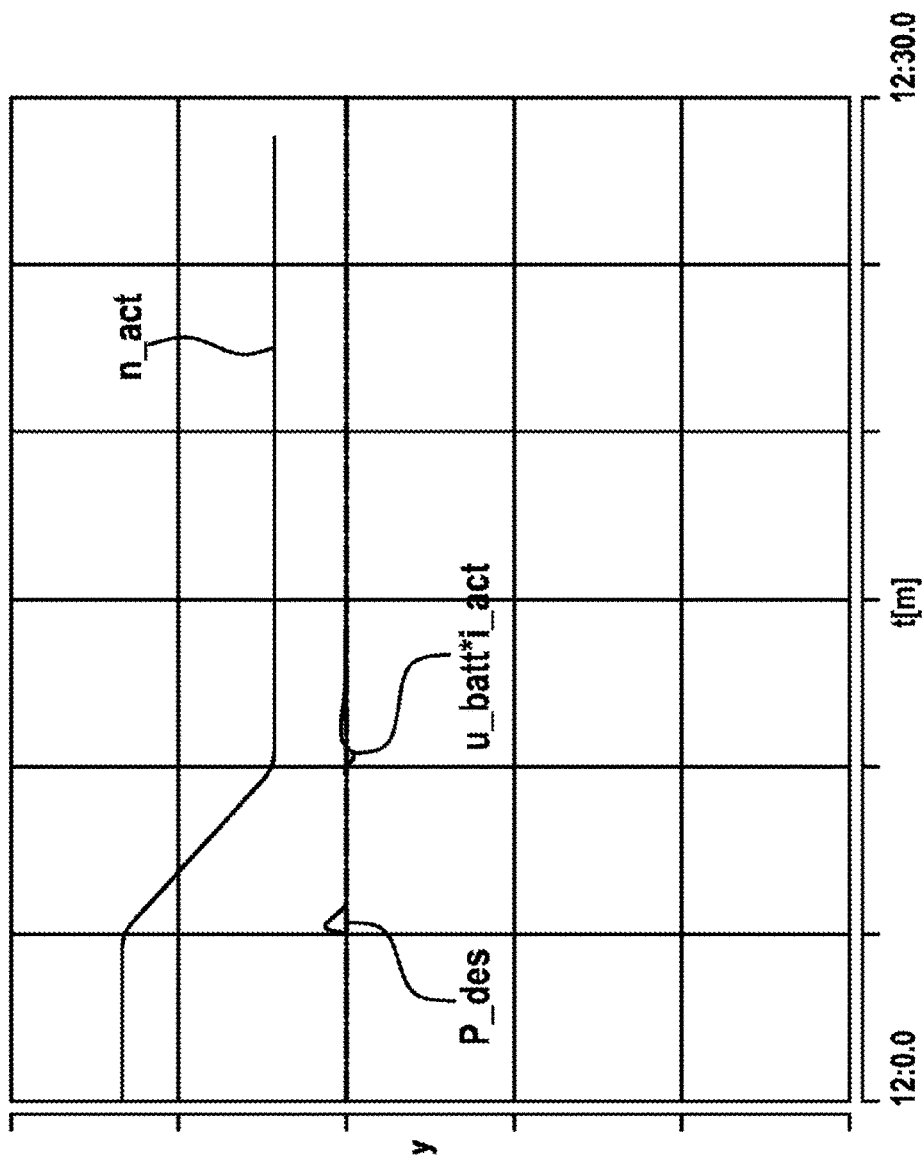
FIG. 10 shows a further graph of the speed change in an engine system according to the invention.
Figure 11:
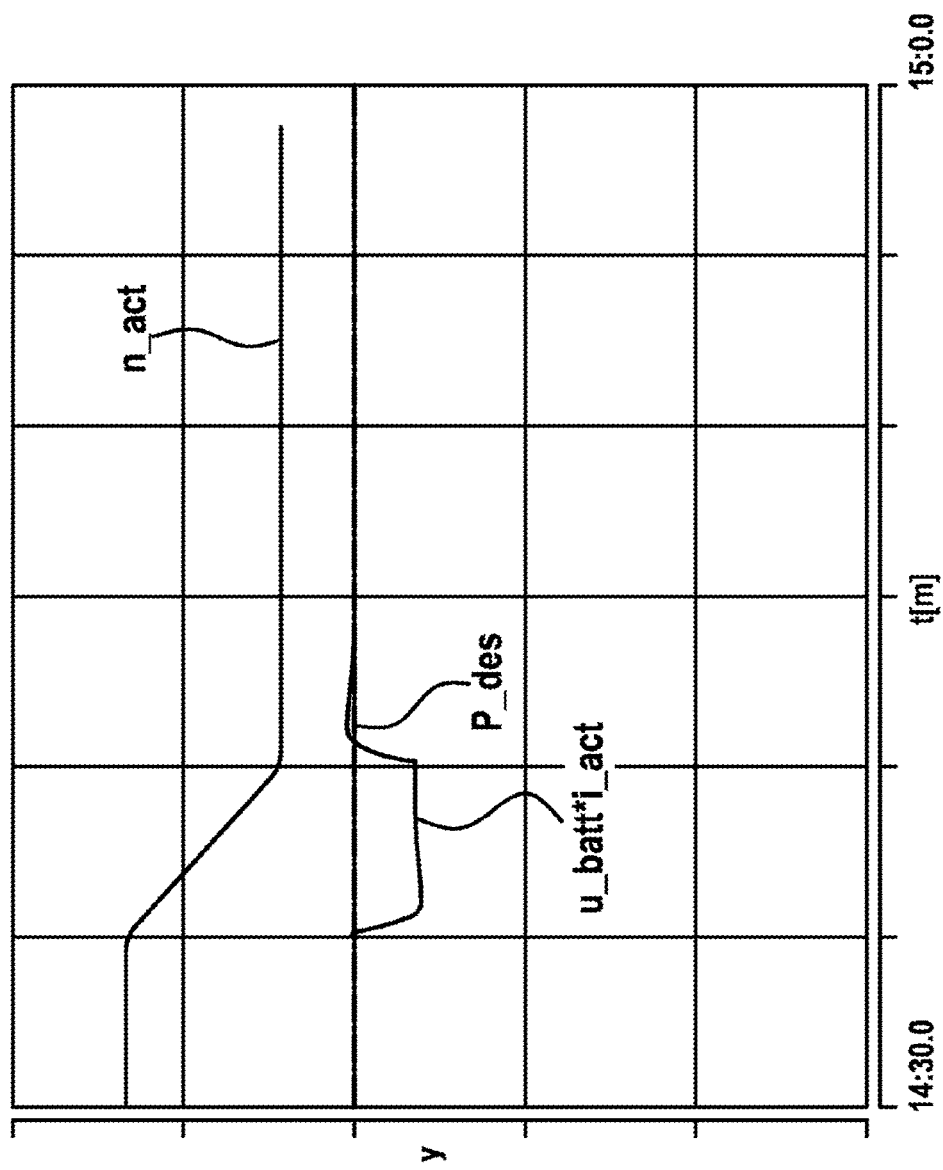
FIG. 11 shows a further graph of the speed change in an engine system according to the invention.
Figure 12:
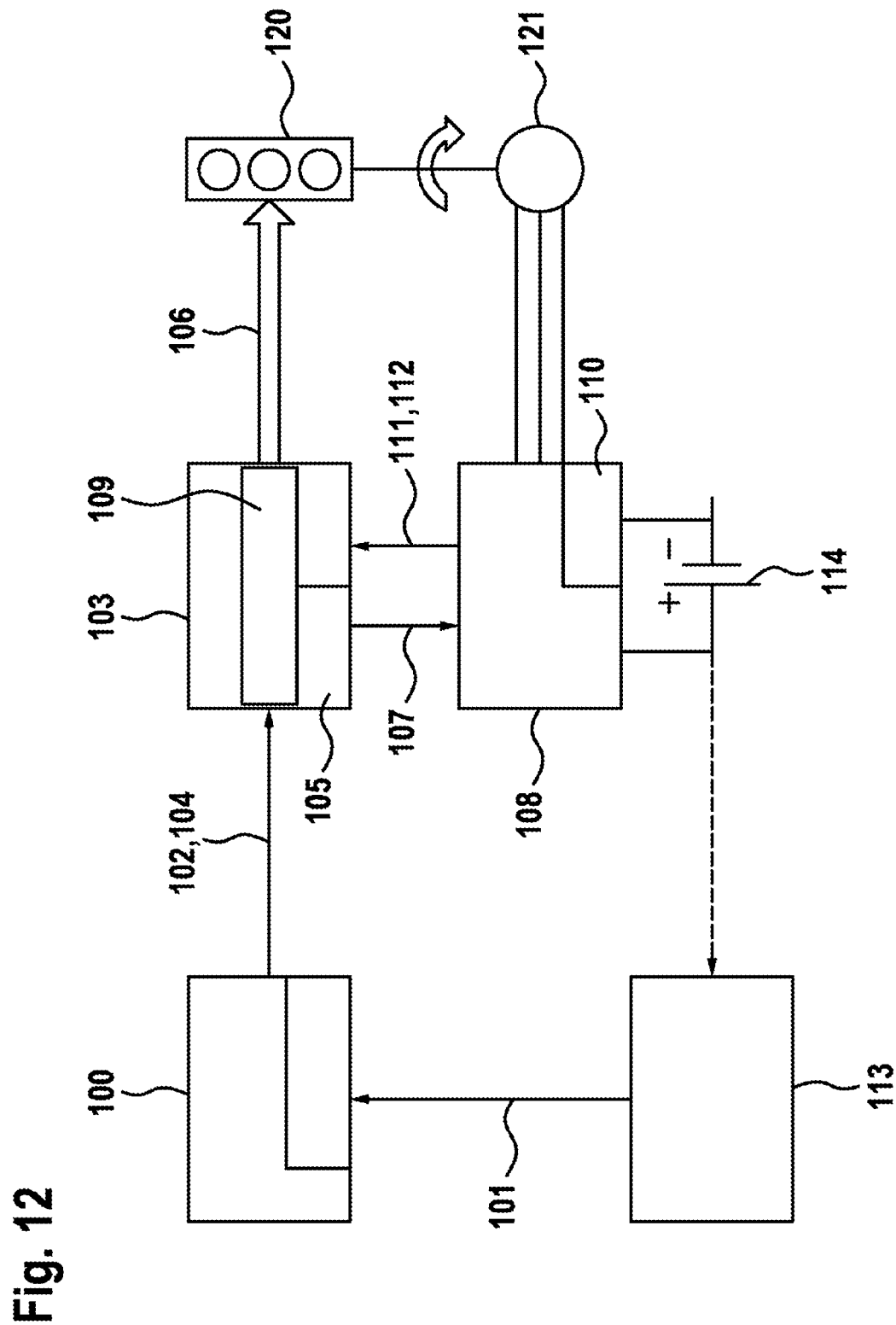
FIG. 12 shows a known engine system.

FIGS. 9-11 show graphs for the output power of the engine system 3 with and without the inertia compensation by the inertia compensation device TK.

Figure 6:
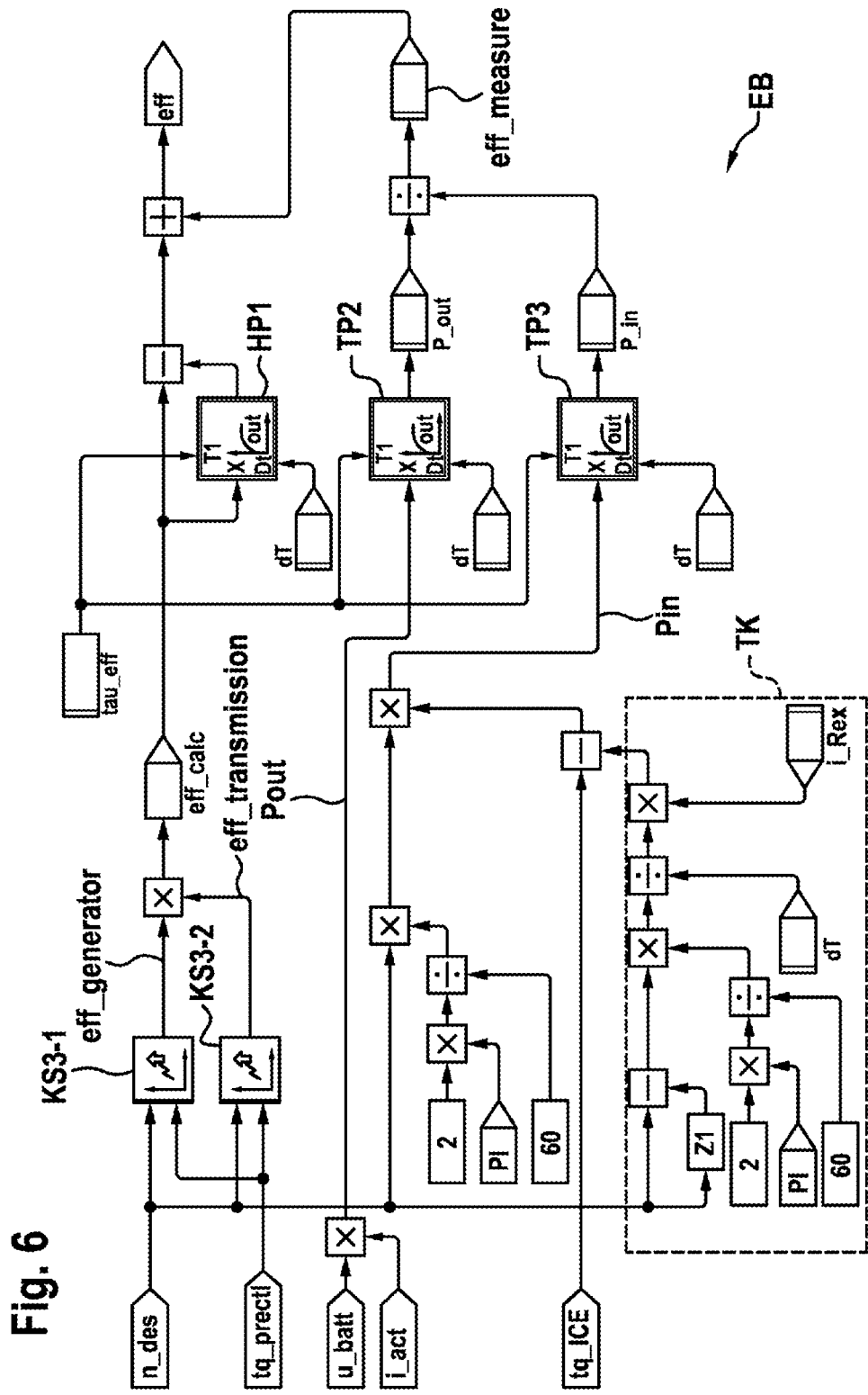
FIG. 6 shows a schematic illustration of one embodiment of an efficiency calculation device according to the invention.

FIG. 6 shows a schematic illustration of one embodiment of an efficiency calculation device EB according to the invention.

The efficiency eff_generator of the generator G, together with the efficiency eff_transmission of an inverter which controls the generator G, is known and is stored in the third characteristic curve memories KS3-1, KS3-2 against the speed and the torque.

If, in one embodiment, the internal combustion engine M and the generator G are not connected to one another via a shaft, but rather via a transmission or a belt, the efficiency of this transmission ratio can likewise be stored in a further characteristic curve memory. The efficiencies from the two or three characteristic curve memories K S3-1, KS3-2 are multiplied by one another and therefore result in the calculated efficiency eff_calc which is based only on calculations.

In a parallel manner, the efficiency eff_measure, which is based on measured values, is calculated from the output power Pout and the input power Pin. The output power Pout is calculated from the measured output signals of the generator current i_act and the high voltage u_batt. The input power Pin is calculated from the desired speed n_des and the torque tq_ICE of the internal combustion engine. The torque caused by the mass moment of inertia j_Rex is also subtracted from the torque tq_ICE. For this purpose, a structure which resembles the inertia compensation device TK is provided in the efficiency calculation device EB. In a further embodiment, the output signal tq_J from the inertia compensation device TK can be made available to the efficiency calculation device EB.

In both methods, an efficiency of 1 is assumed for the internal combustion engine M because the torque tq_ICE, rather than the fuel mass, is used as the input. tq_ICE is the internal combustion engine torque and is used to calculate the throttle valve position, injection and ignition angle for the internal combustion engine M.

Calculating and using the efficiency eff_measure has the advantage that the torque error, which occurs in the torque chain between the signal tq_ICE and the output to the controllers for injection, throttle valve and ignition angle, does not have any effect and the actual efficiency is therefore calculated. The disadvantage of the efficiency eff_measure is that it is calculated mainly using actual values. The efficiency eff_measure must not be used for the downstream control because the actual value positive feedback could result in oscillations. The disadvantage of the efficiency eff_calc is its inaccuracy with respect to torque errors when controlling the internal combustion engine M.

The disadvantages of both efficiencies can be eliminated by combining the two signals. In this case, eff_calc is filtered by means of a first high-pass filter HP1 and eff_measure is subjected to low-pass filtering. Since the calculation of the efficiency eff_measure consists of dividing the input power Pin and the output power Pout, eff_measure itself is not filtered, but rather the input power Pin and the output power Pout are separately subjected to low-pass filtering in the low-pass filters TP2, TP3 in order to avoid producing computing errors in the case of low powers for powers which oscillate in different phases. The high-pass filter TP1 and the low-pass filters TP2, TP3 have the same cut-off frequency and both filtered signals are added. The addition result is the efficiency eff.

Figure 7:
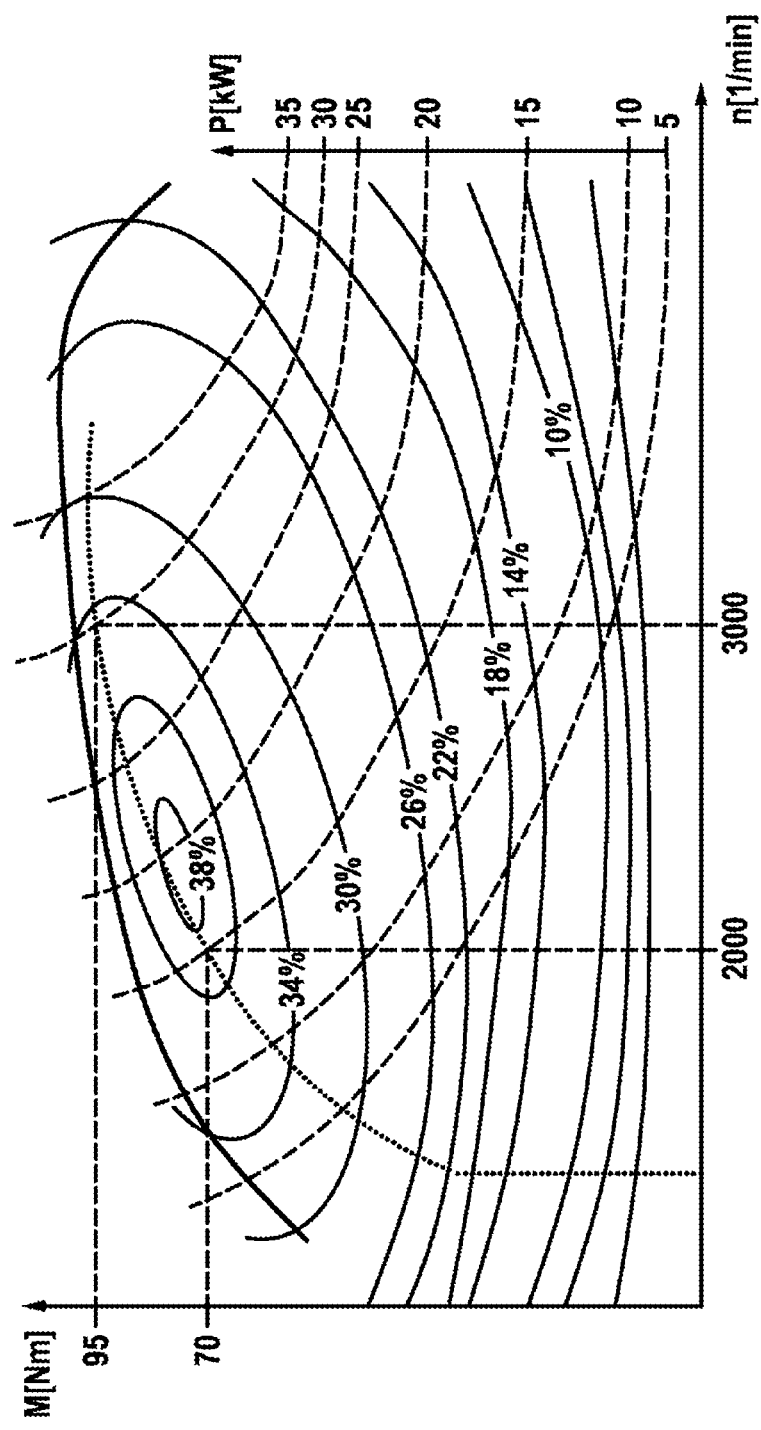
FIG. 7 shows a characteristic curve for the power of an engine system.

FIG. 7 shows a characteristic curve for the power of an exemplary engine system 3 for optimized fuel consumption, that is to say for optimized efficiency. For other embodiments of the engine system 3, the values may differ from the values shown in the graph in FIG. 7.

The abscissa axis of the graph shows the speed of approximately 500 revolutions per minute [1/min] to approximately 4500 revolutions per minute [1/min].

The left-hand ordinate axis of the graph shows the torque in Newton meters [Nm] and the right-hand ordinate axis of the graph shows the power in kilowatts [kW]. In this case, the lines of equal power run upward from the right-hand ordinate axis in the form of an arc.

Concentric lines or ellipses in the graph represent lines of equal efficiency. In this case, the center point of the concentric lines is at approximately 2200 revolutions per minute and 75 Nm and is intersected, for instance, by the line of a power of 20 kW.

During application of the engine system 3, that is to say when tuning the engine system 3 during the development of the engine system 3, the lines of equal efficiency are calculated by multiplying all efficiencies (efficiencies of the internal combustion engine M, the generator G, the inverter and the transmission if present).

The dotted characteristic curve is intended to centrally intersect the concentric lines of equal efficiency such that the best efficiency is achieved for each desired power. However, it is also possible to set the characteristic curve to other values if reasons, such as the generation of noise or a greater dynamic response in the event of a change in the power, are in favor of this.

The line shown here differs from the optimum efficiency at a low speed of approximately 1000 because low powers and a power of 0 must also be set and the internal combustion engine M must continue to rotate in this case. That is to say, the idling speed which is otherwise conventional is represented by the left-hand vertical part of the characteristic curve. As a result of this part of the characteristic curve, there is no need for complicated switching between the idling regulator and the power regulator and it is possible to dispense with the idling regulator which is conventional in the engine control system. Idling can therefore be covered by the requirement for the desired power P_des=0.

Figure 8:
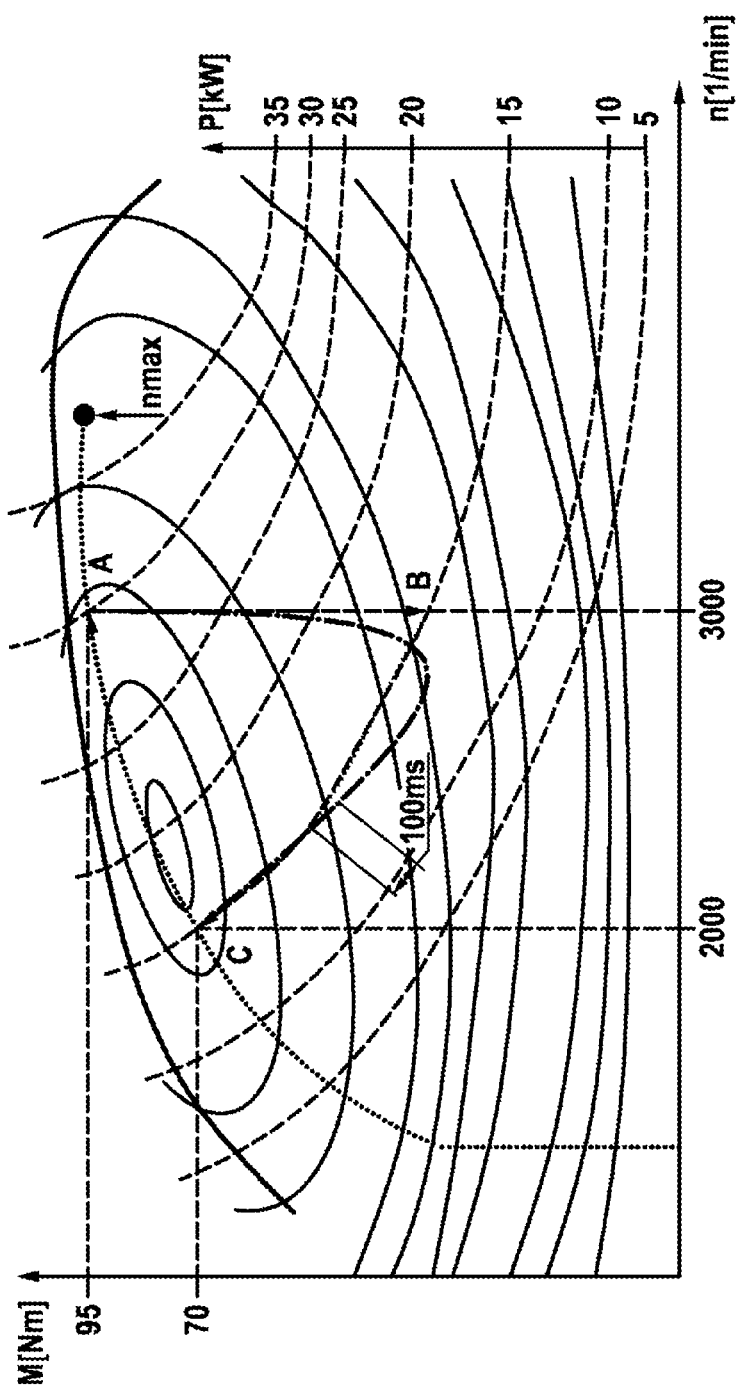
FIG. 8 shows a further characteristic curve for the power of an engine system.

FIG. 8 shows a characteristic curve for a power reduction from 30 kW to 15 kW of an exemplary engine system 3. For other embodiments of the engine system 3, the values may differ from the values shown in the graph in FIG. 7.

At the same time as the power reduction from 30 kW to 15 kW, the speed is changed on the basis of the characteristic curve in FIG. 7. The fast power reduction can be carried out here by quickly reducing the torque. The engine control system of the internal combustion engine M can greatly throttle the throttle valve, for example, can retard the ignition angle and/or can briefly switch off the injection. At the same time, the speed is slowly reduced. The torque can be increased again by the extent to which the reduced speed reduces the power.

In FIG. 8, the power reduction is represented by the dotted line (required operating point) and the dash-dotted curve (operating point which has actually been set). On the basis of the characteristic curve in FIG. 7 at 3000 1/min and 95 Nm, the dotted line runs vertically downward to approximately 50 Nm and from there to 2000 1/min and 70 Nm.

As a result of this flywheel mass compensation, operating points which differ from the characteristic curve in FIG. 7 are dynamically output. However, the desired power can be reduced considerably more quickly as a result of this measure.

FIG. 9 shows a graph of the speed change in an engine system 3 according to the invention without flywheel mass compensation by the inertia compensation device TK.

The abscissa axis of the graph shows the time in minutes from 9:30 to 10:00, that is to say for 30 seconds. The ordinate axis does not show a unit since both the speed and the required power and the actual power of the engine system 3 are represented. However, the units are irrelevant for understanding. The comparison between the three graphs in FIGS. 9-11 clearly reveals the influence of the inertia compensation device TK.

In an engine system 3 having a mass moment of inertia of 0.5 kgm$^2$, the speed is reduced within 5 seconds from 9:35 to 9:40 from 4500 rpm to 3500 rpm with a change rate of 2000 rpm/s. This is illustrated by the upper curve in the graph. During the speed reduction, a power of approximately 4 kW is produced in the engine system 3 and is shown as a difference between the desired power P_des and the actual power calculated from u_batt*i_act.

FIG. 10 shows a further graph of the speed change in an engine system 3 according to the invention with flywheel mass compensation by the inertia compensation device TK. The axes and the speed profile are the same as those from FIG. 9.

FIG. 10 shows the behavior of the engine system 3 with flywheel mass compensation of j_Rex=0.5 kgm². It can be seen that virtually no difference between the desired power and the actual power is produced.

FIG. 11 shows a further graph of the speed change in an engine system 3 according to the invention with flywheel mass compensation by the inertia compensation device TK. The axes and the speed profile are the same as those from FIG. 9. However, the flywheel mass j_Rex was set at j_Rex=1 kgm², which results in considerable overcompensation. This can be seen from the fact that the power which has actually been set is approximately 4 kW below the required power as the speed falls.

The graphs in FIGS. 9-11 were recorded and explained for one possible embodiment of an engine system 3. For further embodiments of the engine system 3, the actual values may differ from the values shown in the graphs in FIGS. 9-11.

Although the present invention was described above using preferred exemplary embodiments, it is not restricted thereto, but rather can be modified in various ways. In particular, the invention can be changed or modified in various ways without departing from the essence of the invention.

The invention claimed is:

1. A power controller (1) for an engine controller (2) for an engine system (3) having an internal combustion engine (M) and an electric generator (G) coupled to the internal combustion engine (M), the power controller (1) comprising:
a computing device (RE) configured to receive a desired power (P_des) for the engine system (3) and a maximum permissible speed (n_max) for the internal combustion engine (M) and to calculate a desired speed (n_des) for the electric generator (G) and an output torque (tq_prectl) of the internal combustion engine (M) on the basis of the desired power (P_des) and the maximum permissible speed (n_max);
an inertia compensator (TK) configured to calculate a torque (tq_J) transmitted to a shaft of the generator (G) by a total mass moment of inertia (j_Rex) of the internal combustion engine (M) and of the generator (G) on the basis of a change in the desired speed (n_des) for the electric generator (G) and to calculate a desired torque (tq_ICE) for the internal combustion engine (M) on the basis of the transmitted torque (tq_J) and the calculated output torque (tq_prectl) of the internal combustion engine (M); and
an efficiency calculator (EB) configured to calculate an efficiency (eff) of the engine system on the basis of the desired speed (n_des) for the electric generator (G) and the calculated output torque (tq_prectl) of the internal combustion engine (M) and a battery voltage (u_bat) and a generator current (i_act) of a battery of the engine system (3) and the calculated desired torque (tq_ICE) for the internal combustion engine (M) and to adapt the value for the desired power (P_des), which is supplied to the computing device (RE), on the basis of the calculated efficiency (eff) and to output it as the desired mechanical power (P_des_mech).

2. The power controller as claimed in claim 1,
the computing device (RE) having a first characteristic curve memory (KS1) having a characteristic curve which has the optimum speed for the internal combustion engine (M) for a predefined mechanical power, the computing device (RE) configured to select the optimum speed (n_opt) on the basis of the desired mechanical power (P_des_mech);
the computing device (RE) having a speed limiter (MN) configured to limit the selected optimum speed (n_opt) on the basis of the maximum permissible speed (n_max);
the computing device (RE) having a rate limiter (RB) configured to obtain the limited speed and to limit the change rate of the limited speed on the basis of a predefined maximum change rate; and
the computing device (RE) having a first low-pass filter (TP1) configured to subject the speed whose change rate has been limited to low-pass filtering and to output it as the desired speed (n_des) for the electric generator (G).

3. The power controller as claimed in claim 2,
the computing device (RE) having at least one second characteristic curve memory (KS2-1, KS2-2) and a selection device (AW) configured to select which characteristic curve memory (KS1, KS2-1, KS2-2) is used to select the optimum speed (n_opt).

4. The power controller as claimed in claim 2,
the computing device (RE) having a divider (D1) configured to divide the desired mechanical power (P_des_mech) by a first constant value (K1), and by the desired speed (n_des) for the electric generator (G) and to output the division result as the output torque (tq_prectl) of the internal combustion engine (M).

5. The power controller as claimed in claim 1,
the inertia compensator (TK) having a memory (Z1) for storing a value of the desired speed (n_des) and configured to respectively calculate a change in the desired speed (n_des) from an instantaneous value of the desired speed (n_des) and a stored older value of the desired speed (n_des);
the inertia compensator (TK) having a multiplier (M1) configured to multiply the calculated value of the change in the desired speed (n_des) by a second constant value (K2), and by a value of the mass moment of inertia (j_Rex) of the internal combustion engine (M) and of the generator (G).

6. The power controller as claimed in claim 1,
the efficiency calculator (EB) having at least one third characteristic curve memory (KS3-1, KS3-2) which stores characteristic curves for the efficiency (eff_generator) of the generator (G) and the efficiency (eff_transmission) of an inverter of the engine system (3), which is coupled to the generator (G), against the speed and the torque,
the efficiency calculator (EB) being designed to calculate a calculation-based value for the efficiency (eff_calc) of the engine system (3) on the basis of efficiencies (eff_generator, eff_transmission) read from the at least one third characteristic curve memory (KS3-1, KS3-2) for the desired speed (n_des) of the electric generator (G) and for the output torque (tq_prectl) of the internal combustion engine (M).

7. The power controller as claimed in claim 1,
the efficiency calculator (EB) configured to calculate an output power (Pout) of the engine system (3) by multiplying the battery voltage (u_bat) by the generator current (i_act); and
the efficiency calculator (EB) configured to calculate an input power (Pin) of the engine system (3) from the desired speed (n_des) for the electric generator (G) and the output torque (tq_prectl) of the internal combustion engine (M).

8. The power controller as claimed in claim 7, the efficiency calculator (EB) configured to subtract the torque (tq_J) transmitted to a shaft of the generator (G) by the mass moment of inertia (j_Rex) of the internal combustion engine (M) from the calculated input power (Pin).

9. The power controller as claimed in claim 6, the efficiency calculator (EB) having a second low-pass filter (TP2) configured to subject the calculated output power (Pout) to low-pass filtering and having a third low-pass filter (TP3) configured to subject the calculated input power (Pin) of the engine system to low-pass filtering; the efficiency calculator (EB) configured to calculate a value, which is based on measured values, for the efficiency (eff_measure) by dividing the filtered calculated output power (Pout) and the filtered calculated input power (Pin) of the engine system (3).

10. The power controller as claimed in claim 9, the efficiency calculator (EB) having a first high-pass filter (HP1) and configured to calculate the efficiency (eff) of the engine system (3) from the value, which is based on measured values, for the efficiency (eff_measure) and from the calculation-based value for the efficiency (eff_calc) of the engine system (3), which is based on high-pass filtering of the calculation-based value for the efficiency (eff_calc) using the high-pass filter (HP1).

11. An engine controller (2) for an engine system (3) having an internal combustion engine (M) and an electric generator (G) coupled to the internal combustion engine (M), the engine controller (2) comprising:
a power controller (1) as claimed in claim 1;
a speed controller (DS) coupled to the power controller (1) and configured to obtain an output torque (tq_prectl) of the internal combustion engine (M) from the power controller (1) and to control the speed (n_act) of the electric generator (G) on the basis of a desired speed (n_des) requested from the power controller (1) and the output torque (tq_prectl) of the internal combustion engine (M).

12. The engine controller as claimed in claim 11, the speed controller (DS) having a speed regulator (DR) configured to calculate a prespecified torque ($tq_{ctl}$) on the basis of the desired speed (n_des) for the electric generator (G) and an instantaneous speed of the electric generator (G);
the speed controller (DS) having a desired current regulator (IR) configured to calculate a desired current ($I_{des}$) for the generator (G) on the basis of the sum of the prespecified torque ($tq_{ctl}$) and the output torque (tq_prectl) of the internal combustion engine (M); and
the speed controller (DS) also having a current controller (IS) configured to set the current (I) in the generator (G) on the basis of the calculated desired current ($I_{des}$).

13. An engine system (3),
having an internal combustion engine (M);
having an electric generator (G) coupled to the internal combustion engine (M); and
having an engine controller (2) as claimed in claim 11 which is coupled to the internal combustion engine (M) and to the generator (G) and is configured to control the internal combustion engine (M) and the generator (G).

14. The power controller as claimed in claim 4, wherein the first constant value (K1) is $2*\pi/60$.

15. The power controller as claimed in claim 5, wherein the second constant value (K2) is $2*\pi/60$.

* * * * *